United States Patent
Murphy

(10) Patent No.: US 6,710,507 B2
(45) Date of Patent: Mar. 23, 2004

(54) DIGITAL CONTROL LOOP TO SOLVE INSTABILITY OF ELECTROSTATIC DRIVES BEYOND ⅓ GAP LIMIT

(75) Inventor: Terence J. Murphy, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 100 days.

(21) Appl. No.: 09/683,490

(22) Filed: Jan. 7, 2002

(65) Prior Publication Data

US 2003/0117152 A1 Jun. 26, 2003

Related U.S. Application Data

(60) Provisional application No. 60/319,038, filed on Dec. 20, 2001.

(51) Int. Cl.[7] .................................................. H02N 1/00
(52) U.S. Cl. ..................................................... 310/309
(58) Field of Search ......................................... 310/309

(56) References Cited

U.S. PATENT DOCUMENTS

| | | | |
|---|---|---|---|
| 5,534,740 A | * | 7/1996 | Higuchi et al. ............. 310/309 |
| 5,789,843 A | * | 8/1998 | Higuchi et al. ............. 310/309 |
| 6,182,941 B1 | * | 2/2001 | Scheurenbrand et al. ............ 251/129.04 |
| 6,525,446 B1 | * | 2/2003 | Yasuda et al. .............. 310/309 |
| 6,538,802 B2 | * | 3/2003 | Wang et al. ................ 359/298 |

* cited by examiner

Primary Examiner—Thomas M. Dougherty
(74) Attorney, Agent, or Firm—W. Daniel Swayze, Jr.; W. James Brady; Frederick J. Telecky, Jr.

(57) ABSTRACT

A circuit (40) and method are provided to create a drive voltage that is linearly proportional to a position of a movable member (12) of an electrostatic actuator device (10) that is positioned by a voltage (18) applied thereto. The circuit (40) has a sensor (42) to sense a position of the movable member (12) from a reference position ($d_0$) to provide an analog position indicating signal. An analog-to-digital converter (ADC) (46) receives the analog position indicating signal and converts it to a digital position indicating signal. A digital signal processor (DSP) (48), programmed to convert the digital position indicating signal into a digital signal that is linearly proportional to the position of the movable member, receives the digital position indicating signal. A digital-to-analog converter (DAC) (50) receives the digital signal that is linearly proportional to the position of the movable member for producing a linear analog positioning command, and a voltage amplifier (52) receives the linear analog positioning command to produce a position voltage and for application to the movable member (12).

8 Claims, 2 Drawing Sheets

DIGITAL CONTROL LOOP TO SOLVE INSTABILITY OF ELECTROSTATIC DRIVES BEYOND ⅓ GAP LIMIT

BACKGROUND OF INVENTION

1. Field of Invention

This invention relates to improvements in drive circuits and techniques for positioning at least one member of an electrostatic actuator, or the like, and more particularly to improvements in drive circuits and techniques for positioning a movable member of an electrostatic actuator beyond the ⅓ gap limitation.

2. Relevant Background

A diagrammatic representation of an electrostatic actuator 10 of the type to which the invention pertains is shown in FIG. 1 to which reference is first made. The actuator 10 includes a first member or plate 12 that is selectively moveable with respect to a reference position, which may be conveniently a second plate 14 that may be stationary with respect to the first, movable plate 12. A spring 16 exerts a separating force on the first plate to separate it from the second, with a linear spring force equal to a spring constant times a distance, x, that the first plate 12 when displaced from its at rest position, $d_0$, measured with respect to the second plate 14 to a position 12'. Additionally, an electrostatic force is applied between the first and second plates by a voltage, V, applied there between by one or more voltage sources 18 to move the moveable member 12 in the direction of the stationary member 14.

It is well known that electrostatic actuation for parallel plate systems with a fixed electrode and a secondary moving plate of given spring constant, k, using a fixed drive voltage will exhibit instability as the deflection of the moving plate approaches ⅓ of the rest gap, $d_0$. This is due to the instability created by the electrostatic varying inversely as the position of the actuator squared and the restoring force of the spring varying linearly. Thus, the force exerted by the electrostatic field is given by:

$$F_{es} = \frac{\varepsilon A V^2}{2(d_0 - x)^2},$$

where $\in$ is the dielectric constant of the material between the actuator parts, A is the area of the actuator parts, V is the applied voltage, $d_0$ is the unexcited distance between the actuator parts, and x is the distance between the actuator parts with a voltage, V, applied. The force exerted by the spring is:

$$F_{spring} = kx,$$

where k is a spring constant.

As a result, this is a limitation for analog control of these actuators and in most cases is a major design driver. The instability can limit functionality and force larger actuator gaps which, in turn, lead to larger actuation voltages, greater control complexity and larger devices. Electrostatic analog micro-mirrors are a good example of devices in which large gaps or complex control are required to produce large angular deflection (>1 degree for mirrors on the order of 1–3 mm). With large angular deflections, it would be optimum to have the gap approach zero at full scale to minimize size and reduce actuation voltage which is known to be a few hundred volts or higher. However, as the gap becomes small, the stability regime of the electrostatic actuator is greatly exceeded, and the design is unacceptable or very complex.

More particularly, the electrostatic force generated by a fixed voltage between two parallel plates which increases asymptotically as the separation of the plates goes to zero. However, the restoring spring force increases only linearly as the displacement increases. FIG. 2 shows a graph of fixed and moving plate and the forces associated with the spring and applied electric field. FIG. 2 shows a plot of the spring force 20 and the electrostatic force for a few different applied voltages 22–25 versus a normalized displacement, $x/d_0$.

In FIG. 2, the region of instability associated with electrostatic operation can clearly be seen. Still more particularly, for smaller voltage levels, the electrostatic force falls below the spring restoring force line, and there are two displacements at which rest position of the movable plate can occur. The voltage curve at which there is only one point of intersection is referred to as the "snap in" voltage. If this voltage is exceeded as shown above, there is no intersection of the electrostatic curve and the spring restoring force curve and thus the movable plate will snap to the fixed plate. Also, the deflection at which the "snap in" voltage is achieved at ~⅓ $x/d_0$. Therefore electrostatic operation, without feedback control, must be limited to less than ⅓ of full scale deflection. This fundamental limitation impacts several key aspects of design performance and size.

What is needed, therefore, is a stable circuit, system, and method for operating or driving an electrostatic actuator beyond the ⅓ gap limitation.

SUMMARY OF INVENTION

According to a broad aspect of the invention, a position sensing scheme is provided to sense the position of an electrostatic actuator and send the measured position output signal to an analog-to-digital converter (ADC), which converts the position signal to a digital signal that is then processed by a digital signal processor (DSP). The DSP converts the actuator position into a linearized digital signal that is linearly proportional to position. The linearized digital signal is scaled to a digital command that is sent to a digital-to-analog converter (DAC). The DAC voltage is linearly proportional to position, and compensates for the electrostatic voltage being inversely proportional to the positions of the actuation and creates a constant electrostatic positioning force.

Thus, according to a broad aspect of the invention, an electrostatic actuator is presented. The electrostatic actuator has a stationary element and an element that is movable with respect to a reference position. A position sensor is arranged to produce an analog position indication signal that indicates a position of the movable element, and a feedback circuit moves the movable element. The feedback circuit has a signal linearizing circuit to receive the analog position indication signal of the position sensor and a driving circuit to provide a linear position drive signal to the movable element. Preferably the linearizing circuit has an analog-to-digital converter (ADC) to digitize the position indication signal, and a programmed digital signal processor (DSP) to produce a linear command signal output from the analog position indication signal.

According to another broad aspect of the invention, a circuit is provided to create a drive voltage that is linearly proportional to a position of a movable member of an electrostatic actuator device that is positioned by a voltage applied thereto. The circuit has a sensor to sense a position of the movable member from a reference position to provide an analog position indicating signal. An analog-to-digital converter (ADC) receives the analog position indicating signal and converts it to a digital position indicating signal. A digital signal processor (DSP), programmed to convert the digital position indicating signal into a digital signal that is linearly proportional to the position of the movable member, receives the digital position indicating signal. A digital-to-analog converter (DAC) receives the digital signal that is linearly proportional to the position of the movable member for producing a linear analog positioning command, and a voltage amplifier receives the linear analog positioning command to produce a position voltage and for application to the movable member.

According to yet another broad aspect of the invention, a method is presented for operating an electrostatic actuator of the type having a first member that is positionable with respect to a reference position in response to a drive voltage applied there between. The method includes sensing a position of the first element with respect to the reference location and generating an analog position indicating signal in response to the sensing a position. The analog position indicating signal is linearized to generate a position drive signal in response thereto, and the drive voltage is generated in response to the position drive signal. The drive voltage is then applied to the first member to modify its position.

According to still another broad aspect of the invention, an electrostatic actuator is presented which has a first member that is positionable with respect to a reference location in response to a drive voltage applied between the first member and a second member. The electrostatic actuator includes means for sensing a position of the first element with respect to the reference location and means for generating an analog position indicating signal in response to an output of the means for sensing a position. Means are provided for linearizing the analog position indicating signal and for generating a position drive signal in response thereto. Means are also provided for generating the drive voltage in response to the position drive signal. Means are further provided for applying the drive voltage to the first member to modify a position of the first member.

One advantage of the invention is that an inherently stable drive is created that allows the actuator to be positioned beyond the ⅓ gap limit for a fixed drive.

It is another advantage of the invention that an idealized feedback technique is provided to remove directly the impact of the electrostatic force being inversely related to the square of the position of the movable actuator.

It is yet another advantage of the invention that the instability issue associated with an electrostatic actuator is solved simply, which significantly improves the micromechanical actuator operation and design. Moreover, a MEMS designer now can easily reduce the gap between plates of an electrostatic drive, which enables both the required voltage level to deflect the moveable element of the device and the size of the overall MEMS device to be reduced.

These and other objects, features and advantages will become apparent to those skilled in the art from the following detailed description, when read in conjunction with the accompanying drawing and appended claims.

BRIEF DESCRIPTION OF DRAWINGS

The invention is illustrated in the accompanying drawing, in which.

In the various figures of the drawing, like reference numerals are used to denote like or similar parts.

DETAILED DESCRIPTION

As will become apparent, the invention provides a circuit and method to create a drive voltage that is linearly proportional to the position of the actuator and thus nullifies the effect of the actuator position on the electrostatic force. This is accomplished through the use of position sensing scheme to sense the position of the electrostatic actuator and to send the measured output to an analog-to-digital converter (ADC). The measured output is converted to a digital signal that is processed by a digital signal processor (DSP). The DSP converts the actuator position into a digital signal that is linearly proportional to the position of the actuator. The digital signal is scaled to a digital command that is sent to a digital-to-analog converter (DAC). The DAC voltage, being linearly proportional to the position of the actuator, compensates for the electrostatic voltage being inversely proportional to the positions of the actuation and creates a constant electrostatic force.

Figure 1:
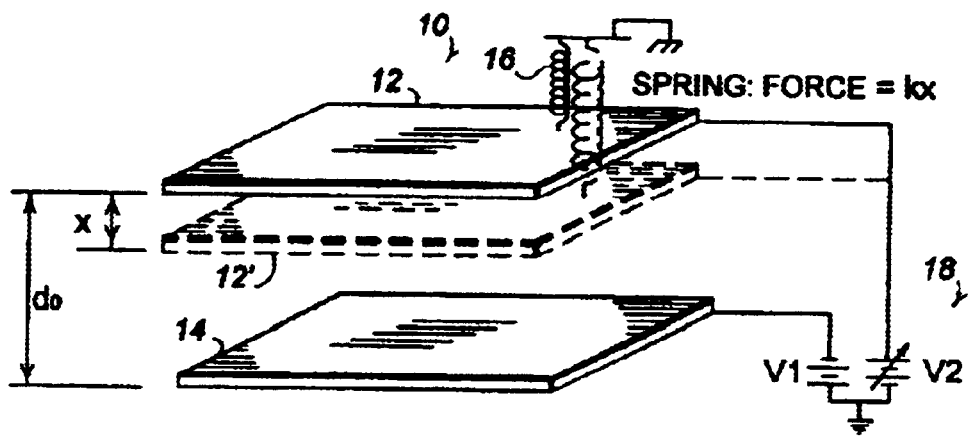
FIG. 1 shows the fixed and moving plates of an electrostatic drive, and the forces associated with the spring and applied electric field thereof.
Figure 2:
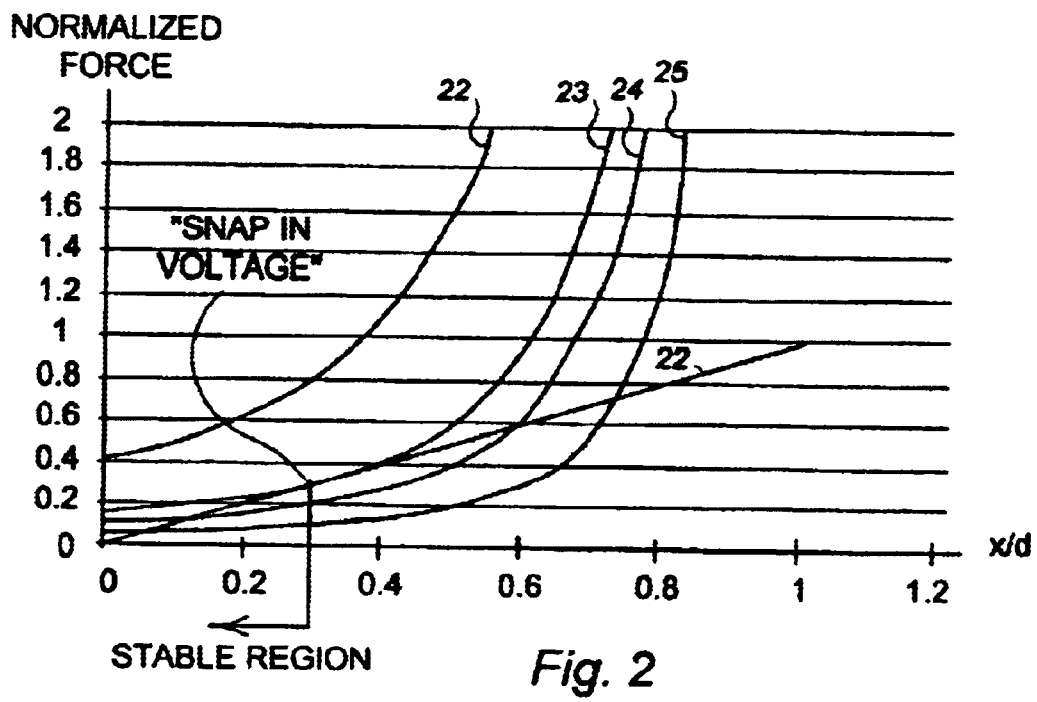
FIG. 2 is a graph of electrostatic force vs. distance, illustrating various normalized electrostatic forces for various spring restoring forces for moving an actuator plate.
Figure 3:
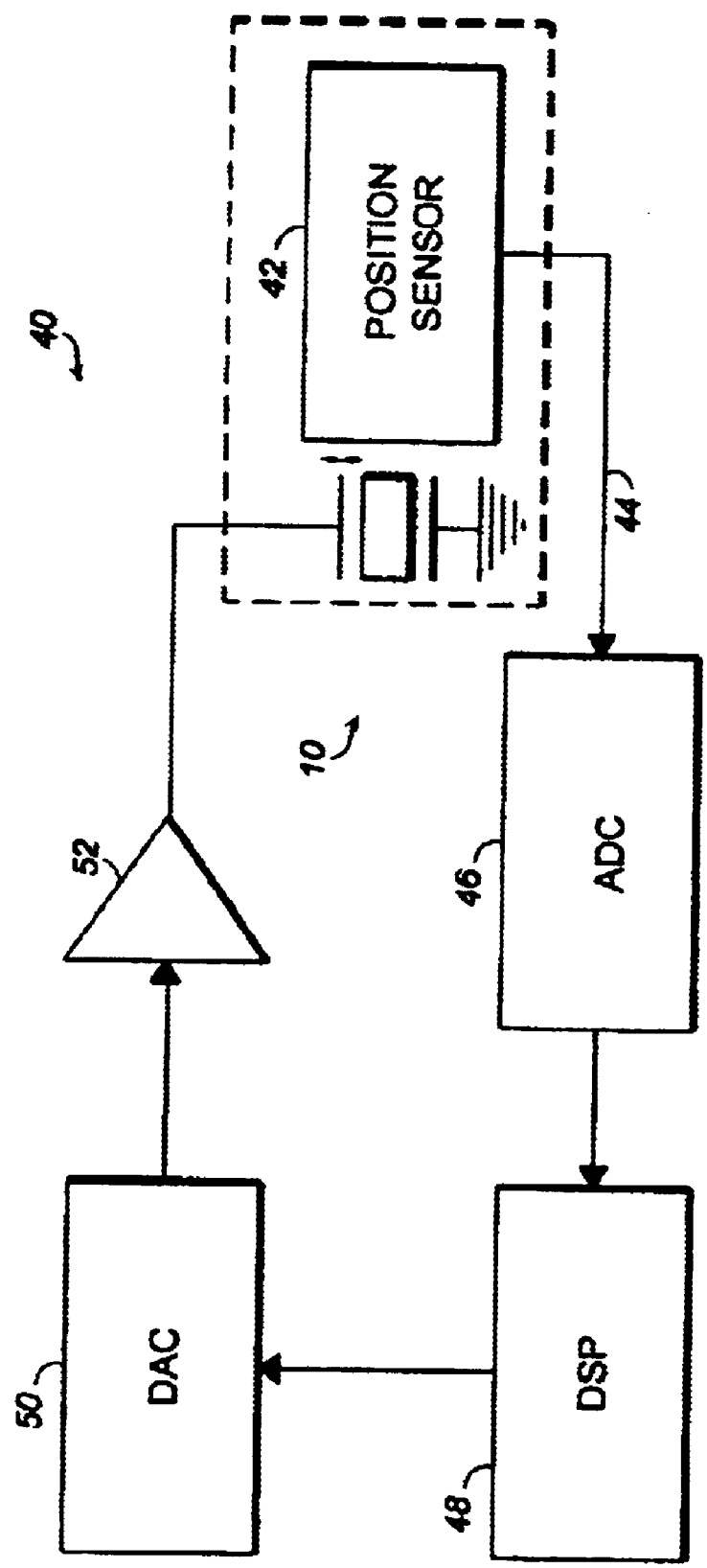
FIG. 3 shows a preferred digital implementation of the invention that solves the electrostatic instability issue, according to a preferred embodiment of the invention.

FIG. 3, to which reference is now made, shows a preferred digital implementation of the invention that solves the electrostatic instability issue. The circuit 40 can be readily produced using available circuit and techniques and processes. The circuit 40 is a control loop that employs a position sensor 42 to sense the position of the moveable member 12 of the actuator 10 to provide an analog positioning signal on line 44 to an ADC 46. The output-positioning signal represents the instantaneous position of the moveable member 12 of the actuator 10.

The ADC 46 digitized the analog signal to provide a digital output signal, which also represents the instantaneous position of the moveable member 12 of the actuator 10. The digital output from the ADC 46 is processed in a DSP 48 to be linearized and conditioned to provide a signal that is linearly proportional to the position of the moveable member 12 of the actuator 10. The DSP may be, for example, programmed to generate a position sense signal of the form:

$$\text{Position} = \alpha x(d_0 - x)$$

where $\alpha$ is a conditioning and scaling constant.

The digitized, conditioned, and linearized signal is then converted back into an analog drive signal by the DAC 50, which is applied via a voltage drive amplifier 52 to position the moveable member 12 of the actuator 10. It should be noted again that the analog drive signal is proportional to the displacement of the movable member 12.

As can be seen in FIG. 3, the electrostatic force may then be represented by:

$$Fes = \frac{\varepsilon A[\alpha x(d_0 - x)]^2}{2(d_0 - x)^2}$$

which is no longer a function of the displacement of the actuator and is a constant for a given applied voltage to the input stage. The circuit removes the instability by applying feedback that changes proportional to the displacement. Thus, as the displacement increases, the voltage of the drive is reduced and a constant applied electrostatic force results. A result, this feedback solves the instability issue, removes multiple stability points for small voltages and allows for operation up to full-scale deflections. It should be noted that the frequency of the control loop 40 should be greater than the mechanical response of the electrostatic actuator 10 herehere so that the actuator does not snap or collapse because the feedback is too slow.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

What is claimed is:

1. An electrostatic actuator, comprising:
    a stationary element;
    an element that is movable with respect to a reference position;
    a position sensor arranged to produce an analog position indication signal that indicates a position of said movable element; and
    a feedback circuit for moving said movable element, said feedback circuit having a signal linearizing circuit to receive said analog position indication signal of said position sensor end a driving circuit to provide a linear position drive signal to said movable element,
    wherein said linearizing circuit comprises an analog-to-digital converter (ADC) to digitize said position indication signal, and a programmed digital signal processor (DSP) to produce a linear command signal output from said analog position indication signal.

2. The electrostatic actuator of claim 1, wherein said reference position is a position of said stationary element.

3. A circuit to create a drive voltage that is linearly proportional to a position of a movable member of an electrostatic actuator device that is positioned by a voltage applied thereto, comprising:
    a sensor to sense a position of said movable member from a reference position to provide an analog position indicating signal;
    an analog-to-digital converter (ADC) for receiving the analog position indicating signal to convert said analog position indicating signal to a digital position indicating signal;
    a digital signal processor (DSP) for receiving said digital position indicating signal, said DSP being programmed to convert the digital position indicating signal into a digital signal that is linearly proportional to the position of said movable member;
    a digital-to-analog converter (DAC) for receiving said digital signal that is linearly proportional to the position of said movable member for producing a linear analog positioning command; and
    a voltage amplifier for receiving said linear analog positioning command to produce a position voltage and for application to said movable member.

4. The circuit of claim 3, wherein said DSP is additionally programmed to scale said digital position indicating signal in the production of said digital signal that is linearly proportional to the position of said movable member.

5. The circuit of claim 3, wherein said reference position is a position referenced to a fixed member of said electrostatic actuator device.

6. A method for operating an electrostatic actuator of the type having a first member that is positionable with respect to a reference position in response to a drive voltage applied therebetween, comprising:
    sensing a position of said first element with respect to said reference location;
    generating an analog position indicating signal in response to said sensing a position;
    linearizing said analog position indicating signal to generate a position drive signal in response thereto;
    generating said drive voltage in response to said position drive signal; and
    applying said drive voltage to said first member to modify a position of said first member,
    wherein said linearizing said analog position comprises digitizing said analog position indicating signal and performing said linearizing in a programmed DSP.

7. The method of claim 6, wherein said linearizing said analog position comprises scaling said analog position indicating signal.

8. The method of claim 6, wherein said reference position is a position of a second member.

* * * * *